(12) United States Patent
Chi

(10) Patent No.: US 7,692,712 B2
(45) Date of Patent: Apr. 6, 2010

(54) APPARATUS AND METHOD FOR PERFORMING OFFSET COMPENSATION, AND COMPUTER-READABLE RECORDING MEDIUM FOR PERFORMING THE OFFSET COMPENSATION

(75) Inventor: Yong Seok Chi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 11/707,943

(22) Filed: Feb. 20, 2007

(65) Prior Publication Data

US 2007/0211351 A1    Sep. 13, 2007

(30) Foreign Application Priority Data

Feb. 20, 2006    (KR) ............... 10-2006-0016191

(51) Int. Cl.
*H04N 5/232* (2006.01)
(52) U.S. Cl. ............... 348/345; 359/698
(58) Field of Classification Search ............... 348/345; 359/694–698
See application file for complete search history.

(56) References Cited

U.S. PATENT DOCUMENTS

| | | | | |
|---|---|---|---|---|
| 5,486,860 A | * | 1/1996 | Shiokawa et al. | 348/354 |
| 5,570,236 A | * | 10/1996 | Hirasawa | 359/697 |
| 2001/0045989 A1 | * | 11/2001 | Onuki | 348/345 |
| 2001/0048479 A1 | * | 12/2001 | Ohkawara et al. | 348/360 |
| 2002/0154241 A1 | * | 10/2002 | Ohkawara | 348/345 |
| 2004/0036794 A1 | * | 2/2004 | Kanayama et al. | 348/345 |
| 2005/0146640 A1 | * | 7/2005 | Shibata | 348/372 |

FOREIGN PATENT DOCUMENTS

JP    11-149102 A    6/1999

* cited by examiner

*Primary Examiner*—Tuan Ho
*Assistant Examiner*—Kent Wang
(74) *Attorney, Agent, or Firm*—Birch, Stewart, Kolasch & Birch, LLP

(57) ABSTRACT

An apparatus and method for performing offset compensation, and a computer-readable recording medium for performing the offset compensation are disclosed. The offset compensation apparatus for use in an optical zoom lens system includes: a lens unit including a zoom lens and a focus lens; a lens conveyance unit for conveying the zoom lens and the focus lens; an offset measurement unit for measuring an offset of the zoom lens and an offset of the focus lens; an offset verifier for verifying the measured offset data of the zoom lens and the focus lens; and a controller for controlling the zoom lens and the focus lens according to the verified offset data.

16 Claims, 9 Drawing Sheets

APPARATUS AND METHOD FOR PERFORMING OFFSET COMPENSATION, AND COMPUTER-READABLE RECORDING MEDIUM FOR PERFORMING THE OFFSET COMPENSATION

This application claims the benefit of Korean Patent Application No. 10-2006-0016191, filed on Feb. 20, 2006, which is hereby incorporated by reference as if fully set forth herein.

BACKGROUND OF THE INVENTION

1. Field of the Invention

The present invention relates to an apparatus and method for performing offset compensation, and a computer-readable recording medium for performing the offset compensation, and more particularly to an apparatus and method for performing offset compensation for use in a camera module, and a computer-readable recording medium for performing the offset compensation.

2. Discussion of the Related Art

Recently, the number of users who desire to use a camera module equipped with an optical zoom function. The optical zoom function can be implemented by moving a zoom lens from a current location to another location using a small-sized motor.

In other words, if the user enters a Wide-zooming signal or a Tele-zooming signal, the zoom lens moves by a drive motor. Therefore, a target-object image captured by a lens system of the camera module zooms in or zooms out, and at the same time a focal length changes. If the zoom lens moves from a current location to another location, a focus lens should be interoperable with the zoom lens, such that an in-focus status between the zoom lens and the focus lens can be maintained.

However, the above-mentioned camera module of the optical zoom lens system has technical difficulty in its design, such that unique- or assembly-tolerances of constituent components (e.g., a part connected to a motor, or a conveyance part, etc.) may be easily encountered. In this case, the above-mentioned camera module has difficulty in maintaining a desired focus when zooming in or out the target-object image.

When unexpected foreign materials are placed on the conveyance part, or a horizontal level of the conveyance part is incorrect, the above-mentioned camera module has difficulty in correctly interworking with the focus lens according to the movement of the zoom lens.

The camera module of the above-mentioned optical zoom lens system compares a first vertex of a real zoom trace curve with a second vertex of a predetermined ideal zoom trace curve in order to recognize a difference between the first vertex and the second vertex, determines the difference between the first vertex and the second vertex to be an offset, and compensates for the offset.

However, the above-mentioned conventional method for performing the offset compensation has disadvantages in that it requires not only a long period of time consumed for the offset compensation but also unnecessary processing operations by hardware.

SUMMARY OF THE INVENTION

Accordingly, the present invention is directed to an apparatus and method for performing offset compensation, and a computer-readable recording medium for performing the offset compensation, that substantially obviate one or more problems due to limitations and disadvantages of the related art.

An object of the present invention is to provide an apparatus and method for compensating for an offset of an optical zoom lens system during a fabrication process of the optical zoom lens system, such that a desired focus can be maintained during a zooming operation, and a computer-readable recording medium for performing the offset compensation.

Another object of the present invention is to provide an apparatus and method for compensating for an offset of an optical zoom lens system, which compensates for an offset between an ideal zoom trace curve and a real zoom trace curve in order to maintain a desired focus, and a computer-readable recording medium for performing the offset compensation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an offset compensation apparatus for use in an optical zoom lens system comprises: a lens unit including a zoom lens and a focus lens; a lens conveyance unit for conveying the zoom lens and the focus lens; an offset measurement unit for measuring an offset of the zoom lens and an offset of the focus lens; an offset verifier for verifying the measured offset data of the zoom lens and the focus lens; and a controller for controlling the zoom lens and the focus lens according to the verified offset data.

Preferably, the offset compensation apparatus further comprises: a conveyance stabilizer for stabilizing conveyance of the zoom lens and the focus lens.

Preferably, the conveyance stabilizer repeatedly conveys the zoom lens and the focus lens, such that it stabilizes the lens conveyance unit.

Preferably, the offset measurement unit measures an offset between an ideal zoom trace curve and a real zoom trace curve, and compensates for the measured offset.

Preferably, the offset verifier verifies the zoom-lens offset and the focus-lens offset measured by the offset measurement unit.

In another aspect of the present invention, there is provided an offset compensation method for use in an optical zoom lens system comprising: a) stabilizing a conveyance unit for conveying a zoom lens and a focus lens; b) compensating for an offset of the zoom lens and an offset of the focus lens; c) verifying the measured offsets of the zoom lens and the focus lens; and d) conveying the zoom lens and the focus lens according to the verified offset data.

Preferably, the step a) includes: a1) repeatedly conveying the zoom lens and the focus lens, and stabilizing a lens conveyance unit.

Preferably, the step b) includes: b1) measuring an offset between an ideal zoom trace curve and a real zoom trace curve, and compensating for the measured offset.

Preferably, the step b1) includes: b1-1) measuring the offset of the focus lens, and compensating for the measured offset; and b1-2) measuring the offset of the zoom lens, and compensating for the measured offset.

In yet another aspect of the present invention, there is provided a computer-readable recording medium comprising: a program for executing individual steps of the offset compensation method of at least one of claims 6 to 15 using a computer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that a zoom lens is indicative of a variator lens capable of adjusting a magnifying power of a camera, and a focus lens is indicative of a master- or compensator-lens for compensating for a focus dimmed by the zooming operation of the camera.

Figure 1:
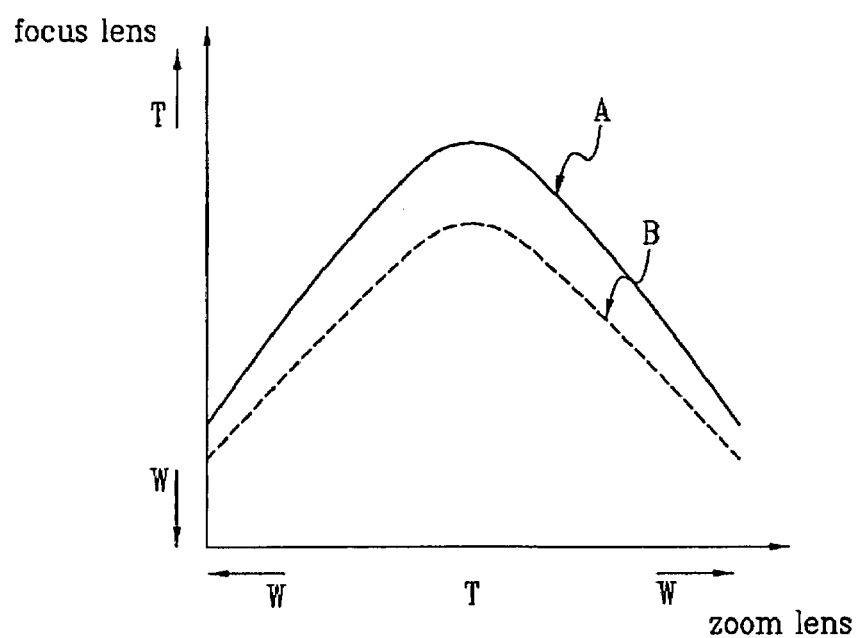
FIG. 1 is a conceptual diagram illustrating a correlation between a moving-stepping offset of a zoom lens associated with a target object and a moving-stepping offset of a focus lens associated with the target object according to the present invention.

FIG. 1 is a conceptual diagram illustrating a correlation between a moving-stepping offset of a zoom lens associated with a target object and a moving-stepping offset of a focus lens associated with the target object according to the present invention.

Referring to FIG. 1, a location value of the focus lens for indicating a clear and distinct image changes according to a distance between a target object to be captured and a camera module, such that the target object should be firstly determined.

In association with the determined target object spaced apart from the camera module by a predetermined distance, location correlation between the zoom lens and the focus lens, which are required to maintain a clear image during the zoom-in or zoom-out process, is depicted in the graph "A" of FIG. 1.

However, if an unexpected error occurs in the fabrication process of the camera module, the "A" graph escapes from given values, as denoted by the graph "B". In more detail, during the zooming process of the target-object image, i.e., during the zoom-in or zoom-out process of the target-object image, the target-object image is defocused, resulting in the occurrence of the dimmed image. Therefore, there is a need to compensate for the dimmed image, such that the zoom lens can be interoperable with the focus lens according to a given correlation. In other words, the "B" graph must be corrected to be the "A" graph, such that a clear image of the target object can be maintained.

Figure 2:
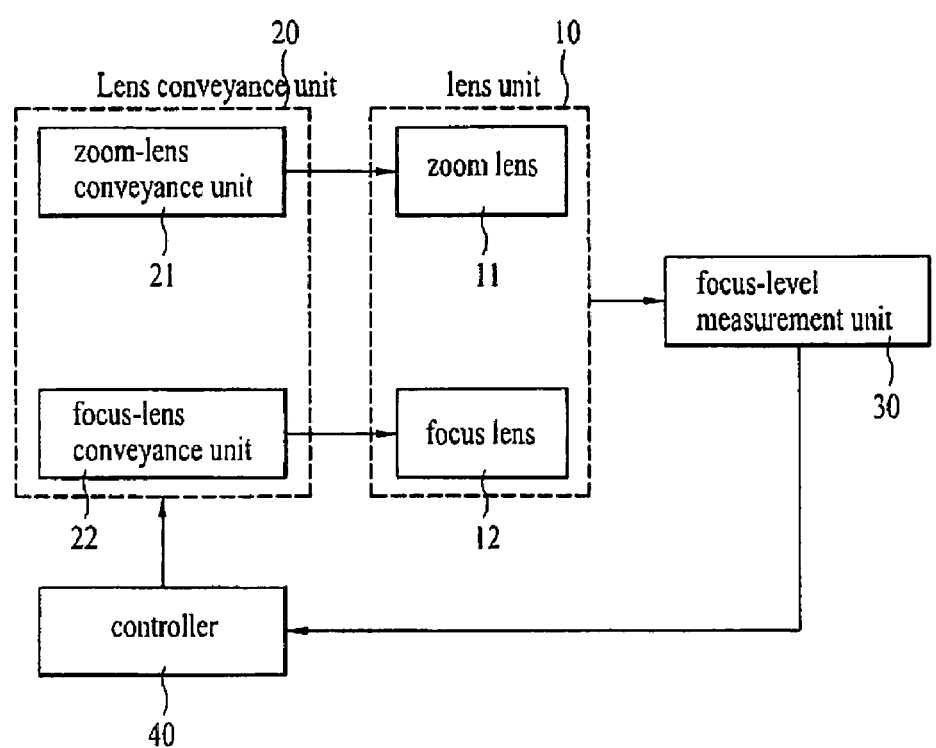
FIG. 2 is a block diagram illustrating an offset compensation apparatus according to a preferred embodiment of the present invention.

FIG. 2 is a block diagram illustrating an offset compensation apparatus according to a preferred embodiment of the present invention.

Referring to FIG. 2, the offset compensation apparatus for the optical zoom lens system according to the present invention includes a lens unit 10, a lens conveyance unit 20, a focus-level measurement unit 30, and a controller 40.

The lens unit 10 includes the zoom lens 11 and the focus lens 12. In this case, the location of the focus lens 12, which can be in-focused according to a distance between the focus lens 12 and the target object (not shown). In the case of zooming in on the target-object image or zooming out from the target-object image, the location of the focus lens 12 at which the same target object is in-focused (i.e., In-Focus mode) is changed to another location, such that the location of the focus lens 12, which is in-focused according to a distance from the target object (not shown) and the location of the zoom lens 11, is determined.

The lens conveyance unit 20 includes individual drivers of the zoom lens and the focus lens, and forms a conveyance path. In other words, the lens conveyance unit 20 includes the zoom-lens conveyance unit 21 and the focus-lens conveyance unit 22.

The zoom lens 11 receives a Wide-zooming signal (W) and a Tele-zooming signal (T), such that it moves to another location via the zoom lens conveyance unit 21. In other words, the zoom lens 11 is continuously stepping along the above-mentioned movement path by its driver. In order to prevent the defocusing from being generated during the above-mentioned zooming process, the focus lens 12 is interoperable with the zoom lens. In other words, the focus lens 12 is also continuously stepping along the above-mentioned movement path by its driver.

The focus-level measurement unit 30 measures an amount of high-frequency components extracted from a target-object image signal received via the camera module lens, and displays the measured amount of high-frequency components. In this case, if it is determined that there is a large amount of high-frequency components, an In-focusing state is established. Otherwise, if it is determined that there is a small amount of high-frequency components, a defocusing state is established. Namely, the lower the amount of high-frequency components, the higher the defocusing state. Therefore, it is determined whether a clear image is implemented or not by measuring the amount of high-frequency components as described above. In other words, if a measured focus level reaches a maximum value, the In-focusing state is established.

The controller 40 determines the number of moving steps or the number of cycles of the zoom lens 11 and the focus lens 12. In this case, the distance from the target object (not shown) and the focus-lens 12's location corresponding to the zoom-lens 11's location can be determined by referring to data stored in a memory (not shown). The memory (not shown) includes correlation data between a location value of the zoom lens 11 and a location value of the focus lens 12. In this case, it should be noted that the location values of the zoom lens 11 and the focus lens 12 are experimentally determined.

If the target object (not shown) is located at a predetermined distance not contained in the stored data, the controller 40 may estimate not only the location of the focus lens 12 being in-focused by an interpolation method, but also moving steps or cycles associated with the focus lens 12. Therefore, the controller 40 can correctly adjust a desired focus without limitation to the stored location value. However, although the above-mentioned operations have been performed, unexpected errors may occur due to some problems encountered during the fabrication step. Therefore, the controller 40 adjusts the moving steps or cycles of the focus lens 12 and the zoom lens 11 according to the measured focus level.

Figure 3A:
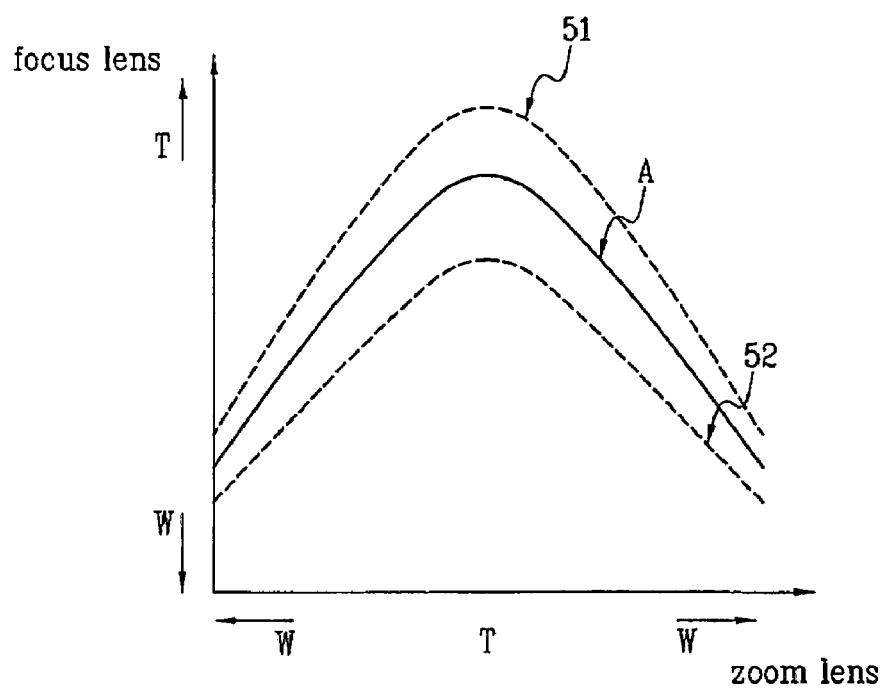
FIGS. 3A~3B graphically show an offset compensation process according to a preferred embodiment of the present invention.
Figure 3B:
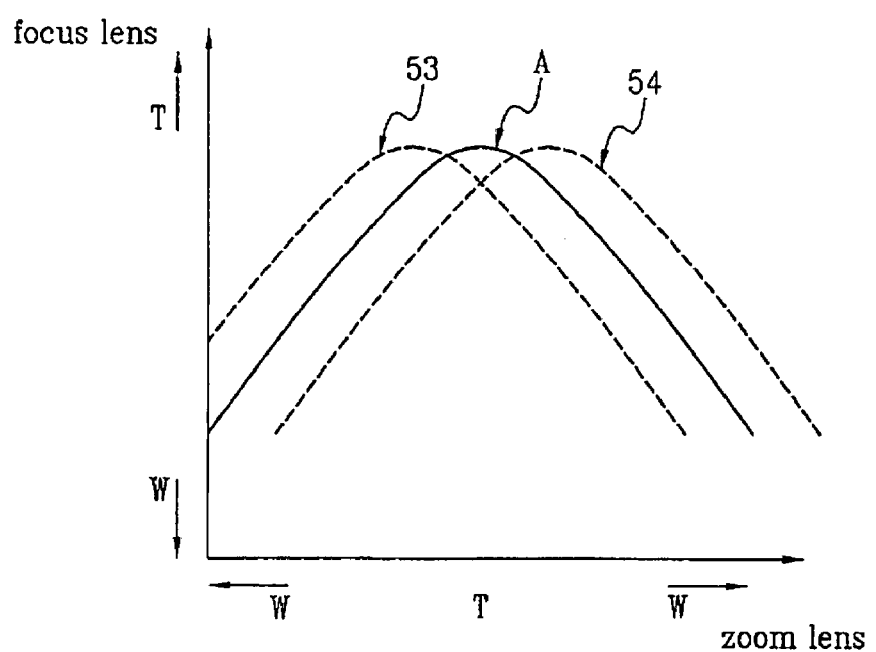

FIGS. 3A~3B graphically show an offset compensation process according to a preferred embodiment of the present invention.

Referring to FIGS. 3A~3B, the offset compensation apparatus measures the focus level to compensate for the offset. A distance from the target object (not shown) is fixed at a predetermined distance. The controller 40 of the offset compensation apparatus moves the focus lens 12 to another location, such that it adjusts a focus of the target object.

The controller moves the zoom lens 11 to a maximum distance in a Wide (W) direction, such that it maximally increases an angle of view (i.e., a view angle). The controller enters a Tele (T) signal, such that it gradually magnifies the image of the target object (not shown). In this case, needless to say, it should be noted that the controller may move the zoom lens 11 having the smallest view angle, and may zoom out from the image of the target object as necessary. In order to maintain a clear image of the target object in response to the movement of the zoom lens 11, the focus lens 12 is designed to be interoperable with the zoom lens 11. If there is an unexpected offset in the fabrication step, the moving steps of the focus lens 12 and the zoom lens 11 escape from the "A" graph, such that the focus level associated with the location of the zoom lens 11 is lowered.

FIG. 3A shows an exemplary case in which there is a difference in moving cycles between the zoom lens 11 and the focus lens 12. In other words, according to the exemplary case of FIG. 3A, the focus lens 12 generates a very small amount of stepping movements according to the moving step of the zoom lens 11, such that it may not reach a desired location at which the focus is correctly acquired, as denoted by a reference number "52" in FIG. 3A.

In this case, the controller increases the number of moving cycles of the focus lens 12, such that the focus-lens 12's location corresponding to the zoom-lens 11's location can be established.

On the contrary, the focus lens 12 generates a large amount of stepping movements, such that it may exceed the desired location at which the focus is correctly acquired, as denoted by a reference number "51" in FIG. 3A. In this case, the controller reduces the number of moving cycles of the focus lens 12, such that it can search for the focus-lens 12's location at which the clearest image is implemented. In this case, in the case of the above-mentioned correction, if the correction is executed at a single point, the overall image is corrected. In other words, if a difference in moving rates between the zoom lens 11 and the focus lens 12 is corrected at a single point, the corresponding curves 51 and 52 move, such that they converge into the "A" curve. In this case, it is preferable that the above-mentioned correction is made at a specific point of a minimum view angle at which the highest offset is acquired.

FIG. 3B shows an exemplary case in which the focus lens 11 has a predetermined number of steps different from that of the focus lens 12, whereas the zoom lens 11 and the focus lens 12 have the same number of moving cycles. In this case, provided that only the focus lens 12 is adjusted, there is no clear image having the highest focus level, such that the zoom lens 11 must be adjusted along with the focus lens 12.

If the number of moving steps of the zoom lens 11 is low as denoted by a reference number "53", the number of moving steps of a stepping motor acting as a driver of the zoom lens 11 increases. Otherwise, if the number of moving steps of the zoom lens 11 is high as denoted by a reference number "54", the number of moving steps of the stepping motor acting as the driver of the zoom lens 11 decreases. As a result, the clear image having the highest focus level can be acquired. In this case, if the correction is executed at a single point, the overall image is corrected. In other words, if a step location is corrected at a single point, the corresponding curves 53 and 53 move, such that they converge into the "A" curve. Therefore, the real correlation between the zoom lens 11 and the focus lens 12 of the camera module is corrected to be the in-focused curve "A".

The offset compensation apparatus for the optical zoom lens system may further include a conveyance controller (not shown) as necessary. In this case, the conveyance controller may be contained in the controller 40 of FIG. 2. The conveyance controller repeatedly moves the zoom lens 11 and the focus lens 12, such that it stabilizes the lens conveyance unit 20. If the lens conveyance unit 20 is unstable, the camera module has different moving steps in association with the same zooming signal.

For example, if the zoom lens 11 moves from the Wide-direction (W) to the Tele-direction (T) by a predetermined distance, the number of moving steps is set to "73". And, the zoom lens 11 moves from the Tele-direction (T) to the Wide-direction (W) by the above-mentioned predetermined distance, the number of moving steps is set to "71". The reason why the zoom lens 11 moves by predetermined distance as described above is that the movement of the lens unit 10 is interrupted by foreign materials or oil inserted into the lens conveyance unit 20. Therefore, if the lens unit 10 repeatedly moves to remove the foreign materials, the number of moving steps or cycles of the lens unit 10 corresponding to the moving signal can be corrected. The above-mentioned stabilization of the lens conveyance unit 20 must be performed prior to the offset compensation of the present invention.

The offset compensation apparatus for the optical zoom lens system according to the present invention may further include a verifier (not shown). The verifier determines whether the lens unit 10 correctly moves upon receiving either a signal entered after the offset compensation or another signal entered before the offset compensation. The verifier (not shown) may be contained in the controller 40 as necessary. The offset compensation apparatus for the camera module of a mobile phone capable of correcting mechanical errors encountered by the fabrication step of the camera module.

Figure 4:
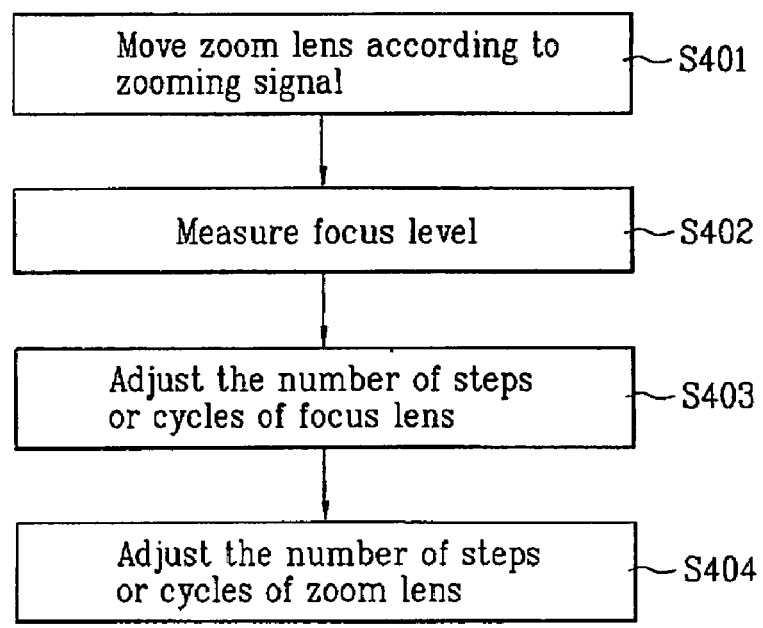
FIG. 4 is a flow chart illustrating an offset compensation method according to a preferred embodiment of the present invention.

FIG. 4 is a flow chart illustrating an offset compensation method according to a preferred embodiment of the present invention.

Referring to FIG. 4, the zoom lens 11 moves according to the zooming signal at step S401. In this case, the in-focused focus lens 12 is located at different locations according to the distance from the target object (not shown), such that the location of the target object (not shown) must be firstly determined. Preferably, the focus lens 12 may move on the basis of the target object to adjust the focus, and may enter the zooming signal. As a result, the zoom lens 11 moves from the in-focus location to another location according to the zooming signal. In this case, it is preferable that the zoom lens 11 moves from a maximum view angle state to a minimum view angle state, or may also move from the minimum view angle state to the maximum view angle state.

If the zoom lens 11 moves to another location, the offset compensation apparatus measures the focus level corresponding to the moved location of the zoom lens 11 at step S402. The offset compensation apparatus adjusts the number of moving steps of the focus lens 12 or the number of cycles of the focus lens 12 at step S403, such that the focus level may reach a maximum value. As described above, although only the focus lens 12 is adjusted, the in-focus correlation can be established.

However, if the aforementioned in-focus correlation is not established after the focus lens 12 has been adjusted, the offset compensation apparatus adjusts the number of moving steps of the zoom lens 11 or the number of cycles of the zoon lens 11 at step S404.

In this case, the overall offset can be corrected by the offset compensation executed at a specific point, and there is a need to compensate for a single representative value, such that the overall offset can be corrected. The above-mentioned operations are equal to those of FIGS. 3A and 3B, such that the offset compensation of the present invention can be executed.

In this case, if the lens unit 10 repeatedly moves prior to the above-mentioned offset compensation process, foreign materials of the lens conveyance unit 20 are removed, resulting in the stabilization of the lens conveyance unit 20.

In this case, the offset compensation method of FIG. 4 may further include a verifying step as necessary. At the verifying step, the lens unit 10 moves from a current location to an desired accurate location upon receiving a signal entered before/after the offset compensation, and determines whether the clear image is maintained or not. In this way, the present invention provides an offset compensation method capable of correcting errors of the optical zoom lens system for use in mobile phones.

Figure 5:
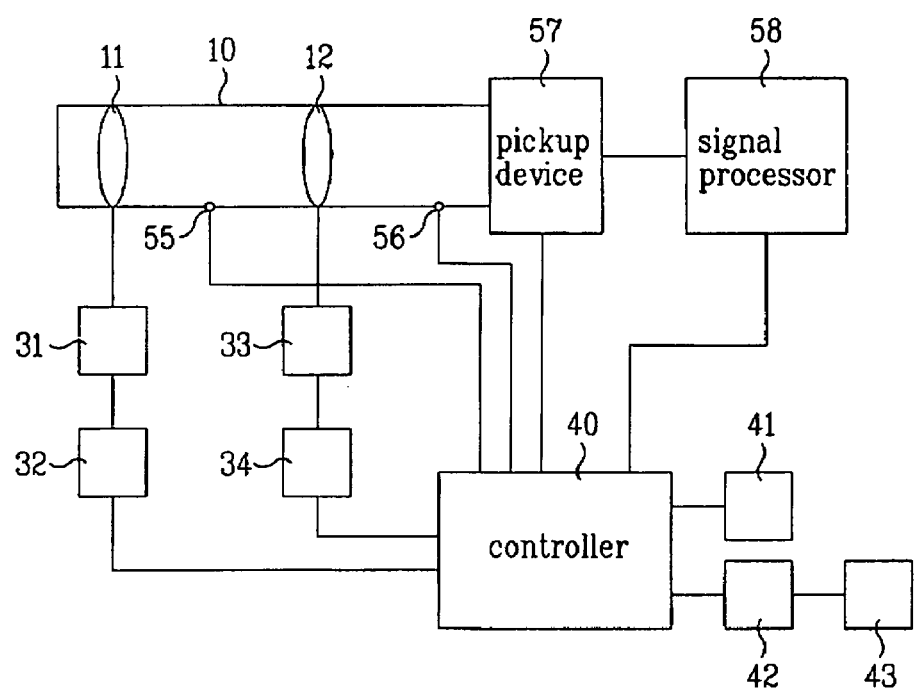
FIG. 5 is a block diagram illustrating a camera module for the offset compensation apparatus according to a preferred embodiment of the present invention.

FIG. 5 is a block diagram illustrating a camera module for the offset compensation apparatus according to a preferred embodiment of the present invention.

Referring to FIG. 5, the camera module according to the present invention receives an optical signal of the target object from the zoom lens 11 and the focus lens 12, and converts the received optical signal into a video signal via a pickup device 57. The video signal is converted into digital signal by a signal processor 58, such that the digital signal is displayed on a display (not shown), or is stored in a memory 41 according to a control signal of the controller 40.

The zoom lens 11 for adjusting the magnifying power of the camera moves by the zoom-lens lens drive 31 (i.e., a first stepping motor). The focus lens 12 interoperable with the movement of the zoom lens 11 moves by the focus-lens drive 33 (i.e., a second stepping motor). A drive signal of the zoom lens 11 is transmitted from the controller 40 to the motor controller 32. A drive signal of the focus lens 12 is transmitted from the controller 40 to the motor controller 34. The stepping motor 31 is driven by the output signal of the motor controller 32, and the stepping motor 33 is driven by the output signal of the motor controller 34.

The camera module of FIG. 5 further includes a first reset sensor 55 for detecting the location of the zoom lens 11 and a second reset sensor 56 for detecting the location of the focus lens 12, such that individual location signals of the zoom lens 11 and the focus lens 11 may be transmitted to the controller 40. The locations of the zoom lens 11 and the focus lens 12 can be recognized by the output signals of the reset sensors 55 and 56 and the number of moving steps or cycles of the stepping motors 31 and 33.

If the magnifying power of the camera is adjusted by the movement of the zoom lens 11, the controller 40 generates a drive signal for moving the focus lens 12, such that the focus lens 12 moves according to the optical zoom lens system's zoom-tracking curve data pre-stored in the memory 41, which has been contained in the motor controllers 32 and 34 or is located at an external part. The memory 41 stores the zoom-tracking curve data, which is different according to the distance between the camera and the target object.

The camera module according to the present invention may further include an offset measurement unit 42 for the zoom and focus lenses 11 and 12, an offset verifier 43 for the zoom and focus lenses 11 and 12, and a conveyance stabilizer (not shown) for the zoom and focus lenses 11 and 12.

The conveyance stabilizer repeatedly moves the zoom lens 11 and the focus lens 12, such that it can stabilize the lens conveyance unit contained in the lens unit 10. In this case, the lens conveyance unit has conveyance paths of the zoom lens 11 and the focus lens 12.

The offset measurement unit 42 measures the zoom-lens 11's offset between the ideal zoom trace curve and the real zoom trace curve, and measures the focus-lens 12's offset between the ideal zoom trace curve and the real zoom trace curve. The offset measurement unit 42 outputs a control signal for conveying the zoom lens 11 and the focus lens 12 according to the measured offset data, such that the offset compensation can be implemented.

The offset verifier 43 receives the offset data of the zoom lens 11 and the focus lens 12 from the offset measurement unit 42, verifies the received offset data, and informs the controller 40 of the verified result.

The conveyance stabilizer 44, the memory 41, the offset measurement unit 42, and the offset verifier 43 may be located at the outside of the controller 40, or may be contained in the controller 40.

Figure 6:
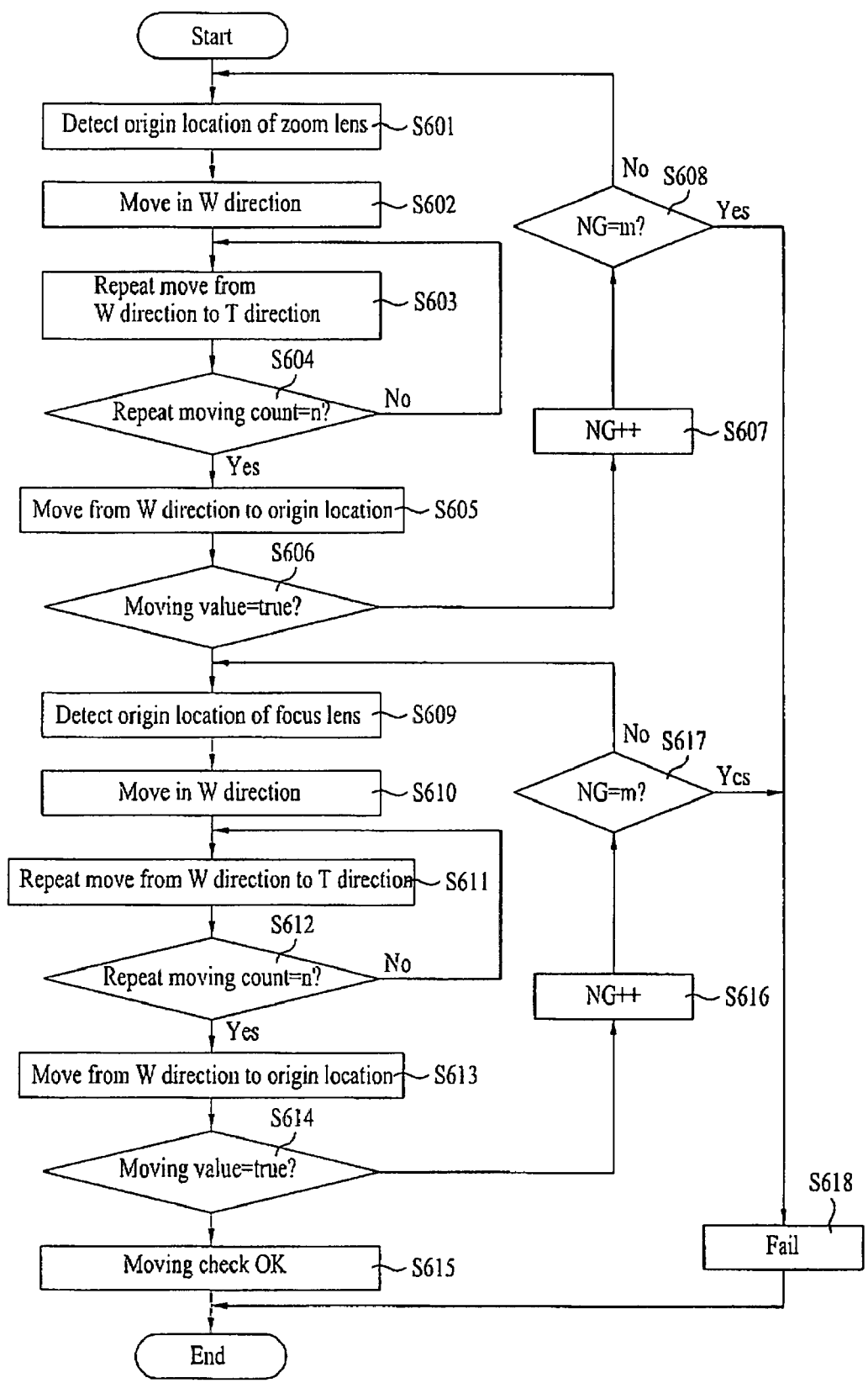
FIG. 6 is a flow chart illustrating a method for stabilizing conveyance of the camera module shown in FIG. 5 according to the present invention.

FIG. 6 is a flow chart illustrating a method for stabilizing conveyance of the camera module shown in FIG. 5 according to the present invention.

Referring to FIG. 6, the origin location of the zoom lens 11 having the optical zoom function is detected at step S601, and the zoom lens 11 moves to a specific point in a wide direction (W) at step S602.

Thereafter, the controller 40 repeatedly moves the zoom lens 11 from a wide-direction location to a tele-direction location at step S603, and determines whether the number of repeated motions of the zoom lens 11 is a specific number "n" at step S604. If the number of repeated motions of the zoom lens 11 is equal to the number "n", the controller 40 goes to step S605. Otherwise, if the number of repeated motions of the zoom lens 11 does not reach the number "n", the controller 40 returns to step S603.

The zoom lens 11 moves from the wide location (W) to the origin at step S605. The controller 40 determines whether the moving value of the zoom lens 11 located at the origin is contained in an allowable error range at step S606. If it is determined that the origin is contained in the allowable error range at step S606, the controller 40 goes to step S609. Otherwise, if it is determined that the origin is not contained in the allowable error range at step S606, the controller 40 increases the number of NG (No Good) decisions at step S607, and determines whether the NG number is equal to a predetermined number "M" at step S608.

If the NG number is not equal to the number "M", the controller 40 returns to step S601, and repeats the above-mentioned steps from step S601. Otherwise, if the NG number is not equal to the number "M", the controller 40 outputs fail data indicating a fail status at step S618, such that it completes the above-mentioned operations.

After stabilizing the zoom lens 11, the controller 40 detects the origin of the focus lens 12 having a next focus function at step S609, and moves the focus lens 12 to a specific point in the wide direction (W) at step S610.

The controller 40 reciprocates the focus lens 12 from the wide-direction point to a specific tele-direction point at step S611. The controller 40 determines whether the number of reciprocating motions of the focus lens 12 reaches the number "n" at step S612. If the number of motions of the focus lens 12 reaches the number "n" at step S612, the controller 40 goes to step S613. Otherwise, if the number of motions of the focus lens 12 does not reach the number "n" at step S612, the controller 40 returns to step S611.

The controller 40 moves the focus lens 12 from the wide-direction point to the origin at step S613. The controller 40 determines whether the moving value of the focus lens 12 located at the origin is contained in an allowable error range at step S614. In this case, if it is determined that the moving value of the focus lens 12 is contained in the allowable error range at step S614, the controller 40 goes to step S615. If it is determined that the origin is not contained in the allowable error range at step S614, the controller 40 increases the number of NG (No Good) decisions at step S616, and determines whether the NG number is equal to a predetermined number "M" at step S617.

If the NG number is not equal to the number "M", the controller 40 returns to step S609, and repeats the above-mentioned steps from step S609. Otherwise, if the NG number is not equal to the number "M", the controller 40 outputs fail data indicating a fail status at step S618, such that it completes the above-mentioned operations.

Figure 7:
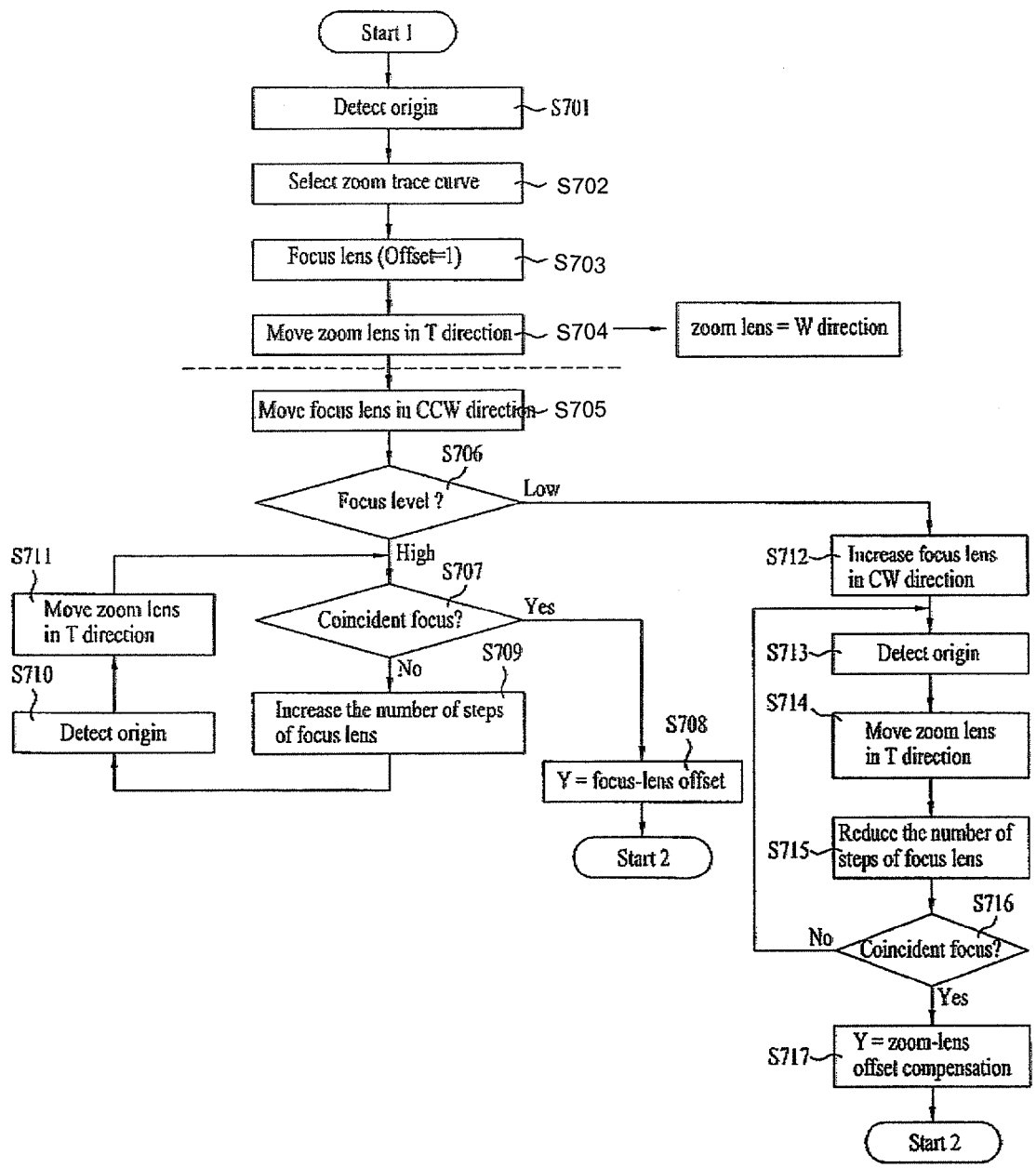
FIG. 7 is a flow chart illustrating an offset compensation method of the camera module shown in FIG. 5 according to the present invention.
Figure 8:
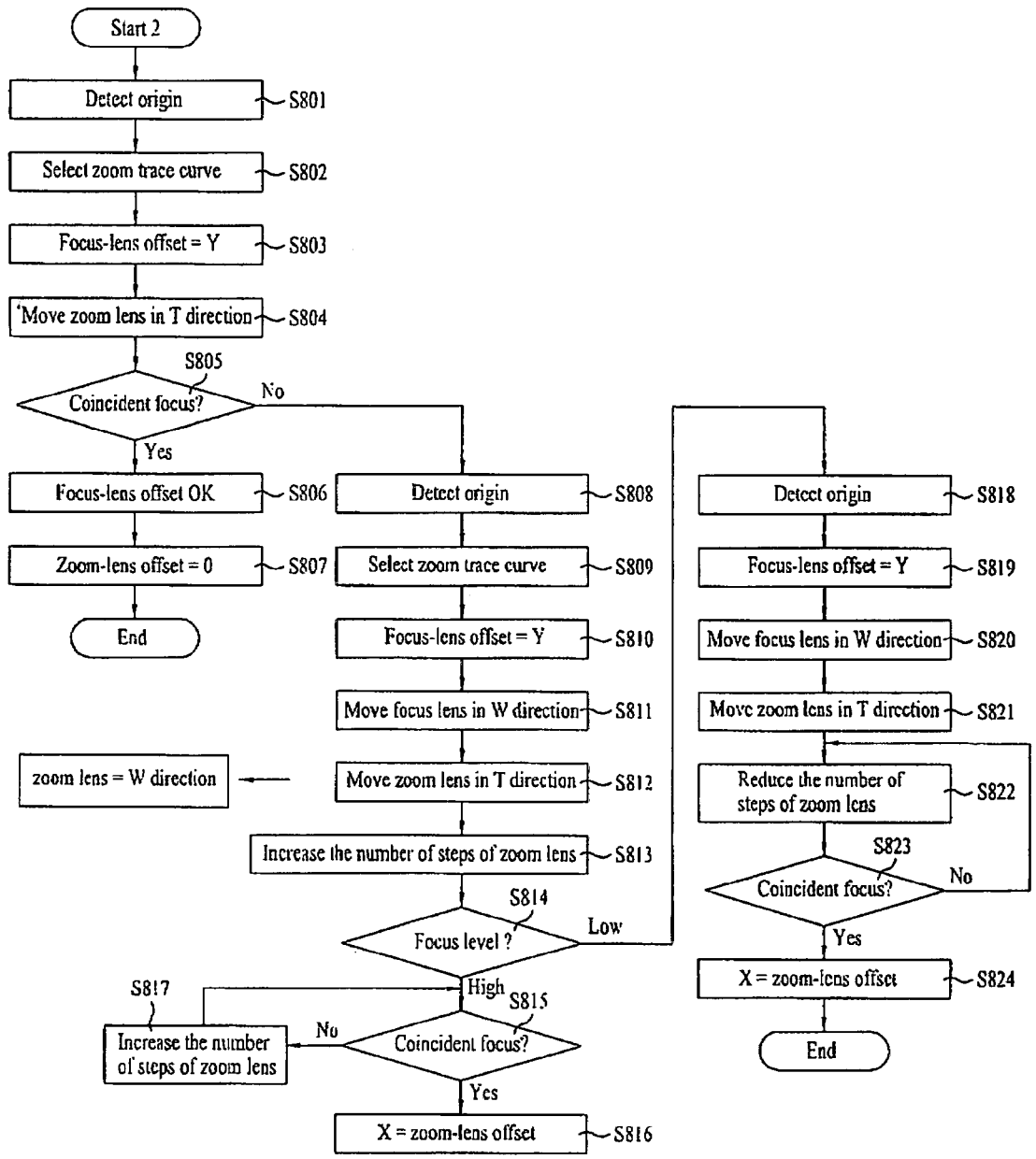
FIG. 8 is a flow chart illustrating an offset compensation method of the camera module shown in FIG. 5 according to another embodiment of the present invention.

FIG. 7 is a flow chart illustrating an offset compensation method of the camera module shown in FIG. 5 according to the present invention, and FIG. 8 is a flow chart illustrating an offset compensation method of the camera module shown in FIG. 5 according to another embodiment of the present invention.

Referring to FIG. 7, the offset compensation method of the camera module for use in the offset compensation apparatus according to the present invention includes: a first step (a) for stabilizing conveyance units of the zoom and focus lenses 11 and 12; a second step (b) for compensating for offset data of the zoom lens 11 and the focus lens 12; a third step (c) for verifying the measured offset data; and a fourth step (d) for conveying the zoom lens 11 and the focus lens 12 according to the verified offset data.

In this case, at the above step (a), the zoom lens 11 and the focus lens 12 repeatedly move to remove foreign materials, such that moving steps or cycles of the lens unit 10 can be correctly established, as previously stated in FIG. 6.

At the above step (b), the controller 40 measures offset data of the zoom lens 11 and the focus lens 12 between the ideal zoom trace curve and the real zoom trace curve, and corrects (or compensates for) the measured offset data. In this case, the above step (b) may further include the step of measuring/correcting the offset of the focus lens 12, and another step of measuring/correcting the offset of the zoom lens 11.

The above-mentioned method for measuring/correcting individual offsets of the focus lens 12 and the zoom lens 11 will hereinafter be described with reference to FIG. 7.

According to a method for measuring the offset of the focus lens 12, the controller detects individual origins of the zoom lens 11 and the focus lens 12 at step S701, and selects a zoom trace curve depending on a distance from a target object (not shown) at step S702.

The controller resets the offset of the focus lens 12 to be "0" at step S703. The controller moves the zoom lens 11 to at least one of the Tele-direction (T) or the Wide-direction (W). For the convenience of description and better understanding of the present invention, it is assumed that the zoom lens 11 moves to the Tele-direction (T) at step S704.

The driver of the focus lens 12 increases the number of moving steps or cycles of the stepping motor 33 in a CCW direction at step S705.

The controller measures a focus level (High or Low) using a Hill Climb Curve scheme at step S706. In this case, the Hill Climb Curve scheme checks a maximum view-angle point using an AF (Auto Focus) filter, determines a maximum view-angle point. In more detail, the Hill Climb Curve scheme determines the Low focus level when the maximum view-angle point is located at the left side of a vertex of the zoom trace curve having been selected according to the distance from the target object, and determines the High focus level when the maximum view-angle point is located at the right side of the vertex of the selected zoom trace curve. The controller increase or reduces the number of driving steps or cycles of the focus lens 12 according to the measured focus level, compensates for the offset of the focus lens 12 simultaneously while measuring the offset of the focus lens 12, and stores the offset of the measured focus lens 12 in the memory 41.

If it is determined that the focus level measured at step S706 is the High focus level, the controller determines the presence or absence of a coincident focus at step S707. If the presence (i.e., YES) of the coincident focus is determined at step S707, the controller stores an offset "Y" of the focus lens 12 in the memory, and goes to the next step (denoted by Start 2 in FIG. 7) for measuring an offset of the zoom lens 11. If the absence (i.e., NO) of the coincident focus is determined at step S707, the controller gradually increases the number of moving steps or cycles of the focus lens 12 at step S709, detects the origins of the zoom lens 11 and the focus lens 12 at step S710, moves the zoom lens 11 in the Tele-direction (T) at step S711, and repeats the above-mentioned operations until the presence (YES) of the coincident focus is determined.

If it is determined that the focus level measured at step S706 is the Low focus level, the controller increases the number of moving steps or cycles of the stepping motor 33 serving as the drive of the focus lens 12 in the CW direction at step S712, detects the origins of the zoom lens 11 and the focus lens 12 at step S713, and moves the zoom lens 11 in any one of several tele-directions (T) at step S714. In this case, for the convenience of description, it is assumed that the zoom lens 12 moves in the tele-direction (T). Next, the controller gradually reduces the number of moving steps or cycles of the stepping motor 33 acting as the drive of the focus lens 12 at step S715, and determines the presence or absence of the coincident focus at step S716.

If the presence (i.e., YES) of the coincident focus is determined at step S716, the controller stores an offset "Y" of the focus lens 12 in the memory 41, and goes to the next step (denoted by Start 2 in FIG. 7) for measuring an offset of the zoom lens 11. If the absence (i.e., NO) of the coincident focus is determined at step S716, the controller returns to step S713 for detecting the origin, and repeats the above-mentioned operations until the presence (YES) of the coincident focus is determined.

As described above, the controller compensates for the offset of the focus lens 12 simultaneously while measuring the offset of the focus lens 12, and measures the offset of the zoom lens 11 using the measured focus lens 12's offset having an allowable error range.

The above-mentioned method for measuring/correcting individual offsets of the focus lens 12 and the zoom lens 11 will hereinafter be described with reference to FIG. 8.

The controller detects the origins of the focus lens 12 and the zoom lens 11 at step 801, and selects a zoom trace curve according to the distance from the target object at step S802.

The controller selects the focus-lens 12's offset stored in the memory 41 at step S803, and moves the zoom lens 11 in at least one of the tele-direction (T) and the wide-direction (W) at step S804. In this case, for the convenience of description, it is assumed that the zoom lens 11 moves in the tele-direction (T).

Next, the controller determines the presence or absence of the coincident focus at step S805. If the presence (i.e., YES value) of the coincident focus is determined at step S805, the controller determines that the offset of the focus lens 12 is in focus, such that it outputs the OK value at step 806. The controller determines the offset of the zoom lens to be "0", and stores the offset value "0" in the memory.

If the absence (i.e., NO value) of the coincident focus is determined at step S807, the controller detects the origins of the focus lens 12 and the zoom lens 11 at step S808, and selects a zoom trace curve according to the distance from the target object at step S809. Next, the controller selects the offset "Y" of the focus lens 12 at step S810, and moves the focus lens 12 in at least one of the tele-direction(T) and the wide-direction (W) at step S811.

The controller gradually increases the number of moving steps or cycles of the stepping motor 31 acting as the drive of the zoom lens 11 at step S813, and measures the focus level (High or Low) at step S814. The step S814 for measuring the focus level is equal to the above step S706 for measuring the focus level, such that a detailed description of the above step S814 will herein be omitted for the convenience of description.

The controller adjusts the number of moving steps or cycles of the stepping motor 31 acting as the driver of the zoom lens 11 according to the measured focus level (High or Low), measures the offset of the zoom lens 11, compensates for the offset of the zoom lens 11, and stores the finally-measured offset of the zoom lens 11 in the memory 41.

In this case, if it is determined that the measured focus level is the High focus level at step S814, the controller determines the presence (YES) or absence (NO) of the coincident focus at step S815. If the presence (YES) of the coincident focus is determined at step S815, the controller sets the offset of the zoom lens 11 to a "X" value, and stores the X value in the memory 41 at step S816. If the absence (NO) of the coincident focus is determined at step S815, the controller gradually increases the number of moving steps or cycles of the zoom lens 11 at step S817, and repeats the above-mentioned operations until the presence (YES) of the coincident focus is determined.

If it is determined that the focus level measured at step S814 is the Low focus level at step S814, the controller detects origins of the zoom lens 11 and the focus lens 12 at step S818, selects the focus-lens 12's offset "Y" stored in the memory 41 at sep S819, and moves the focus lens 12 in at least one of the tele-direction (T) and the wide-direction (W) at step S820.

For the convenience of description, it is assumed that the focus lens 12 moves in the wide-direction (W) at step S820. The controller gradually reduces the number of moving steps or cycles of the zoom lens 11 at step S822, and determines the presence or absence of the coincident focus at step S823. In this case, if the presence (YES) of the coincident focus is determined at step S823, the controller stores the offset "X" of the zoom lens 11 in the memory 41 at step S824. Otherwise, if the absence (NO) of the coincident focus is determined at step S823, the controller returns to step S822, and repeats the above-mentioned operations until the presence of the coincident focus is determined.

The above-mentioned offset compensation method can also be implemented with codes stored in a computer-readable recording medium. The computer-readable recording medium includes all kinds of recording devices, each of which stores computer-readable programs or data, for example, a ROM, a RAM, a CD-ROM, a magnetic tape, a HDD, a floppy disc, a flash memory, and an optical-data storage unit.

In this case, the program stored in the recording medium indicates series of command data capable of being directly or indirectly used in an information processing device (e.g., a computer) for acquiring specific resultant data. Therefore, the computer includes all kinds of devices, each of which includes a memory, an I/O (Input/Output) unit, and an arithmetic control unit, etc., and has information processing capacity for performing a specific function.

As apparent from the above description, an apparatus and method for performing offset compensation, and a computer-readable recording medium for performing the offset compensation according to the present invention have the following effects.

The offset compensation apparatus or method prevents the defocusing problem, which has been encountered by a fabrication step of a small-sized camera module, from being generated, and corrects unexpected errors of the camera module during the fabrication step, such that it can maintain a clear image when zooming in on the target-object image or zooming out from the target-object image according to the zooming signal.

Although the present invention has been mainly disclosed on the basis of a digital camera, it should be noted that the scope of the present invention is not limited to the above-mentioned digital camera, and can also be applied to all kinds of optical zooming products (e.g., mobile phones or potable multimedia displays).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An offset compensation apparatus for use in an optical zoom lens system comprising:

a lens unit including a zoom lens and a focus lens;

a lens conveyance unit which conveys the zoom lens and the focus lens;

an offset measurement unit which measures an offset of the zoom lens and an offset of the focus lens;

an offset verifier which verifies the measured offset data of the zoom lens and the focus lens; and a controller which controls the zoom lens and the focus lens according to the verified offset data, wherein the offset measurement unit performs the measuring of the offset of the focus lens by:
detecting an origin of the focus lens and an origin of the zoom lens;
selecting a zoom trace curve according to a distance from a target object;
resetting the offset of the focus lens, such that the focus-lens offset is to be zero "0";
moving the zoom lens in a tele-direction (T) or a wide-direction (W);
increasing the number of moving steps of cycles of the focus lens in a CCW direction;
measuring a focus level, and determining a high focus level (High) or a low focus level (Low); and
adjusting the number of moving steps or cycles of the focus lens according to the measured focus level (High or Low), and storing the offset of the focus lens, and
the offset measurement unit performs the measuring of the offset of the zoom lens by:
detecting an origin of the focus lens and an origin of the zoom lens;
selecting a zoom trace curve according to a distance from a target object;
applying the stored focus-lens offset;
moving the zoom lens in the tele-direction (T);
determining the presence (YES) or absence (NO) of a coincident focus; and
storing the zoom-lens offset when the presence (YES) of the coincident focus is determined, or adjusting the number of moving steps or cycles of the zoom lens when the absence (NO) of the coincident focus is determined so that the adjusted offset of the zoom lens is stored.

2. The apparatus according to claim 1, further comprising:
a conveyance stabilizer which stabilizes conveyance of the zoom lens and the focus lens.

3. The apparatus according to claim 2, wherein the conveyance stabilizer repeatedly conveys the zoom lens and the focus lens, such that it stabilizes the lens conveyance unit.

4. The apparatus according to claim 1, wherein the offset measurement unit measures an offset between an ideal zoom trace curve and a real zoom trace curve, and compensates for the measured offset.

5. The apparatus according to claim 1 or 4, wherein the offset verifier verifies the zoom-lens offset and the focus-lens offset measured by the offset measurement unit.

6. An offset compensation method for use in an optical zoom lens system comprising:
a) stabilizing a conveyance unit which conveys a zoom lens and a focus lens;
b) compensating for an offset of the zoom lens and an offset of the focus lens;
c) verifying the measured offsets of the zoom lens and the focus lens; and
d) conveying the zoom lens and the focus lens according to the verified offset data,
wherein the compensating for the offset of the focus lens comprises:
b1-1-1) detecting an origin of the focus lens and an origin of the zoom lens;
b1-1-2) selecting a zoom trace curve according to a distance from a target object;
b1-1-3) resetting the offset of the focus lens, such that the focus-lens offset is to be zero "0";
b1-1-4) moving the zoom lens in a tele-direction (T) or a wide-direction (W);
b1-1-5) increasing the number of moving steps of cycles of the focus lens in a CCW direction;
b1-1-6) measuring a focus level, and determining a high focus level (High) or a low focus level (Low); and
b1-17) adjusting the number of moving steps or cycles of the focus lens according to the measured focus level (High or Low), and storing the offset of the focus lens, and
the compensating for the offset of the zoom lens comprises:
b-2-1) detecting an origin of the focus lens and an origin of the zoom lens;
b-2-2) selecting a zoom trace curve according to a distance from a target object;
b-2-3) applying the stored focus lens offset;
b-2-4) moving the zoom lens in the tele-direction (T);
b-2-5) determining the presence (YES) or absence (NO) of a coincident focus; and
b-2-6) storing the zoom lens offset when the presence (YES) of the coincident focus is determined, or adjusting the number of moving steps or cycles of the zoom lens when the absence (NO) of the coincident focus is determined so that the adjusted offset of the zoom lens is stored.

7. The method according to claim 6, wherein the step a) includes:
repeatedly conveying the zoom lens and the focus lens, and stabilizing a lens conveyance unit.

8. The method according to claim 6, wherein the step b) includes:
measuring an offset between an ideal zoom trace curve and a real zoom trace curve, and compensating for the measured offset.

9. The method according to claim 6, wherein the step b1-1-6) further includes:
b1-1-6-a) if the measured focus level is determined to be the high focus level (High), determining the presence (YES) or absence (NO) of a coincident focus; and
b1-1-6-b) storing the offset of the focus lens according to the determined result indicating the presence (YES) or absence (NO) of the coincident focus.

10. The method according to claim 9, wherein the step b1-1-6-a) includes:
if the absence (NO) of the coincident focus is determined, gradually increasing the number of moving steps or cycles of the focus lens; and
repeating the increasing operation of the moving steps or cycles until the presence (YES) of the coincident focus is determined.

11. The method according to claim 9, wherein the step b1-1-6) further includes:
b1-1-6-1) if the measured focus level is determined to be the low focus level (Low), increasing the moving steps or cycles of the focus lens in a CW direction;
b1-1-6-2) detecting an origin of the zoom lens and an origin of the focus lens;
b1-1-6-3) moving the zoom lens in a tele-direction (T);
b1-1-6-4) gradually reducing the number of moving steps or cycles of the focus lens; and
b1-1-6-5) storing the offset of the focus lens when the presence (YES) of the coincident focus is determined, or repeating the above operations when the absence (NO) of the coincident focus is determined.

12. The method according to claim 6, wherein the step b-2-5) for determining the presence (YES) or absence (NO) of the coincident focus includes:
detecting an origin of the focus lens and an origin of the zoom lens;
selecting a zoom trace curve according to a distance from a target object;

applying the stored focus-lens offset;
moving the focus lens in the wide-direction (W);
moving the zoom lens in the tele-direction (T) or the wide-direction (W);
gradually increasing the number of moving steps or cycles of the zoom lens;
measuring a focus level, and determining a high focus level (High) or a low focus level (Low); and
adjusting the number of moving steps or cycles of the zoom lens according to the measured focus level (High or Low), and storing the offset of the zoom lens.

13. The method according to claim 12, wherein the measuring of the focus level includes:
if the measured focus level is determined to be the high focus level (High), determining the presence (YES) or absence (NO) of a coincident focus; and
storing the offset of the zoom lens according to the determined result indicating the presence (YES) or absence (NO) of the coincident focus.

14. The method according to claim 13, wherein the determining of the presence (YES) or absence (NO) of a coincident focus includes:
if the absence (NO) of the coincident focus is determined, gradually increasing the number of moving steps or cycles of the zoom lens; and
repeating the increasing operation of the moving steps or cycles until the presence (YES) of the coincident focus is determined.

15. The method according to claim 12, wherein the measuring of the focus level includes:
detecting an origin of the focus lens and an origin of the zoom lens;
applying the stored focus-lens offset;
moving the focus lens in the wide-direction (W);
moving the zoom lens in the tele-direction (T);
gradually reducing the number of moving steps or cycles of the zoom lens; and
storing the offset of the zoom lens or repeating the above operations according to the presence (YES) or absence (NO) of the coincident focus.

16. A computer-readable recording medium comprising:
a program for executing individual steps of the offset compensation method of claim 6 using a computer.

* * * * *